(12) United States Patent
Mangla et al.

(10) Patent No.: US 12,743,643 B2
(45) Date of Patent: Sep. 22, 2026

(54) USING QUANTUM NETWORKS TO DISTRIBUTE CONFIGURATIONS IN A DISTRIBUTED SYSTEM

(71) Applicant: International Business Machines Corporation, Armonk, NY (US)

(72) Inventors: Utpal Mangla, Toronto (CA); Paridhi Verma, Mount Kisco, NY (US); Gerald Coon, Durham, NC (US); Satishkumar Sadagopan, Leawood, KS (US); Mark B. Ritter, Sherman, CT (US); Mudhakar Srivatsa, White Plains, NY (US); Mathews Thomas, Flower Mound, TX (US); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 18/126,308

(22) Filed: Mar. 24, 2023

(65) Prior Publication Data

US 2024/0320531 A1 Sep. 26, 2024

(51) Int. Cl.
*G06N 10/20* (2022.01)
*G06F 9/30* (2018.01)
(Continued)

(52) U.S. Cl.
CPC ............. *G06N 10/20* (2022.01); *G06F 21/44* (2013.01); *G06F 9/30* (2013.01); *G06F 13/10* (2013.01);
(Continued)

(58) Field of Classification Search
CPC ........ G06N 10/20; G06N 10/40; G06F 30/34; G06F 9/30; G06F 9/33505; G06F 13/10; G06F 21/10; G06F 21/44
(Continued)

(56) References Cited

U.S. PATENT DOCUMENTS 7,167,899 B2 * 1/2007 Lee ..................... H04M 7/0027
709/227
9,692,523 B2 6/2017 Smith et al.
(Continued)

FOREIGN PATENT DOCUMENTS

CN 113168580 A * 7/2021 ............. G06N 10/80
JP 2008097405 A * 4/2008
(Continued)

OTHER PUBLICATIONS

Metwaly et al., "Architecture of Decentralized Multicast Network Using Quantum Key Distribution and Hybrid WDM-TDM," Advances in Information Science and Computer Engineering, Feb. 2015, pp. 504-518, retrieved from https://www.researchgate.net/publication/278705229_Architecture_of_Decentralized_Multicast_Network_Using_Quantum_Key_Distribution_and_Hybrid_WDM-TDM.
(Continued)

*Primary Examiner* — Phallaka Kik
(74) *Attorney, Agent, or Firm* — Joseph P. Curcuru

(57) ABSTRACT

A computer-implemented method, according to one approach, includes receiving at least one set of qubits at a first client component, and using the at least one set of qubits to index a configuration dictionary to determine a first configuration. The configuration dictionary defines a plurality of different configurations. The method further includes causing the first client component to be configured according to the first configuration. A computer program product, according to another approach, includes a computer readable storage medium having program instructions embodied therewith. The program instructions are readable and/or executable by a first client component to cause the first client component to perform the foregoing method. A system, according to another approach, includes a processor, and logic integrated with the processor, executable by the pro-
(Continued)

cessor, or integrated with and executable by the processor. The logic is configured to perform the foregoing method.

20 Claims, 5 Drawing Sheets

(51) Int. Cl.
*G06F 13/10* (2006.01)
*G06F 21/10* (2013.01)
*G06F 21/44* (2013.01)
*G06F 30/34* (2020.01)
*G06N 10/40* (2022.01)

(52) U.S. Cl.
CPC .............. *G06F 21/10* (2013.01); *G06F 30/34* (2020.01); *G06N 10/40* (2022.01)

(58) Field of Classification Search
USPC .... 716/117, 128; 713/2, 100, 151, 164, 171; 709/221, 222, 225, 249; 710/10; 977/759, 839, 940, 945
See application file for complete search history.

(56) References Cited

U.S. PATENT DOCUMENTS

| | | | | |
|---|---|---|---|---|
| 9,735,890 | B2 | 8/2017 | Agarwal et al. | |
| 11,170,318 | B2 | 11/2021 | Ashrafi | |
| 11,316,677 | B2 | 4/2022 | Ko et al. | |
| 11,533,171 | B2 | 12/2022 | Hong et al. | |
| 2015/0254216 | A1* | 9/2015 | DeLuca | G06F 40/134 715/206 |
| 2019/0171973 | A1* | 6/2019 | Shao | G06F 30/30 |
| 2020/0174879 | A1* | 6/2020 | Javadiabhari | G06F 11/0721 |
| 2020/0202247 | A1* | 6/2020 | Hu | G06N 10/20 |
| 2020/0311220 | A1* | 10/2020 | Gunnels | G06N 10/80 |
| 2021/0058244 | A1 | 2/2021 | Jacak et al. | |
| 2021/0126800 | A1 | 4/2021 | De La Rocha Gómez-Arevalillo et al. | |
| 2021/0176055 | A1* | 6/2021 | Rahman | G06N 10/60 |
| 2021/0399743 | A1* | 12/2021 | Zheng | G06N 10/70 |
| 2022/0027171 | A1* | 1/2022 | Javadiabhari | G06N 10/80 |
| 2022/0114471 | A1* | 4/2022 | Vacon | G06N 10/20 |
| 2022/0216924 | A1 | 7/2022 | Rahman | |
| 2022/0269975 | A1* | 8/2022 | Smith | G06N 10/70 |
| 2022/0286358 | A1* | 9/2022 | Kmak | H04L 67/34 |
| 2022/0294616 | A1 | 9/2022 | Parry et al. | |
| 2022/0311604 | A1 | 9/2022 | Kaplan et al. | |
| 2022/0321333 | A1 | 10/2022 | Wissel et al. | |
| 2022/0393864 | A1 | 12/2022 | Doi et al. | |
| 2023/0142419 | A1* | 5/2023 | Hu | G06N 10/70 706/45 |
| 2023/0186130 | A1* | 6/2023 | Yu | G06N 10/20 359/107 |
| 2023/0267355 | A1* | 8/2023 | Kelly | G06N 10/70 714/48 |
| 2023/0385683 | A1* | 11/2023 | Yoo | G06N 10/80 |
| 2024/0020561 | A1* | 1/2024 | Coady | G06N 10/20 |
| 2024/0143894 | A1* | 5/2024 | Widdows | G06F 30/398 |
| 2024/0303527 | A1* | 9/2024 | Fujisaki | G06N 10/40 |
| 2024/0338466 | A1* | 10/2024 | Scarcelli | G06F 21/606 |
| 2024/0354630 | A1* | 10/2024 | Lee | G06N 10/70 |
| 2026/0134317 | A1* | 5/2026 | Vacon | G06N 10/20 |
| 2026/0154600 | A1* | 6/2026 | Smith | G06N 10/70 |

FOREIGN PATENT DOCUMENTS

| | | | | |
|---|---|---|---|---|
| WO | WO-2020037300 | A1 * | 2/2020 | G06N 10/20 |
| WO | WO-2020200758 | A1 * | 10/2020 | G06N 10/80 |

OTHER PUBLICATIONS

Zhao et al., "Quantum Transport Protocols for Distributed Quantum Computing," arXiv, 2021, pp. 1-18, retrieved from https://arxiv.org/abs/2105.08109.

Li et al., "Fidelity-Guaranteed Entanglement Routing in Quantum Networks," arXiv, 2022, 16 pages, retrieved from https://arxiv.org/abs/2111.07764.

Tann, W., "Quantum Remote Entanglement for Medium-Free Secure Communication?" arXiv, 2022, 15 pages, retrieved from https://arxiv.org/abs/2202.00830.

Wang et al., Multicast Scheme Based on Fidelity Metrics in Quantum Networks, IEEE Access, vol. 7, May 9, 2019, pp. 65703-65713.

Zhao et al., "Quantum broadcast and multicast schemes based on partially entangled channel," IEEE Access, vol. 8, 2020, pp. 29658-29666.

Picoquant, "Quantum Communication," PicoQuant, 2023, 9 pages, retrieved from https://www.picoquant.com/applications/category/quantum-optics/quantum-communication.

Haitjema, M., "A Survey of the Prominent Quantum Key Distribution Protocols," 2007, 12 pages, retrieved from https://www.cse.wustl.edu/~jain/cse571-07/ftp/quantum/index.html on Mar. 20, 2023.

* cited by examiner

Configuration 0:

- Server Port: 80
- API1: create_entry
- API2: read_entry
- API3: update_entry
- API4: delete_entry Configuration 1:

- Server Port: 8800
- API1: new_entry
- API2: get_entry
- API3: mod_entry
- API4: rm_entry

⋮

Configuration $2^N$:

- Server Port: 2348
- API1: make_entry
- API2: fetch_entry
- API3: change_entry
- API4: forget_entry

USING QUANTUM NETWORKS TO DISTRIBUTE CONFIGURATIONS IN A DISTRIBUTED SYSTEM

BACKGROUND

The present invention relates to communication networks, and more specifically, this invention relates to using a quantum network to distribute a communication network configuration in a distributed system.

Classical communication networks typically include a plurality of devices, e.g., computers, cellular phones, processors, controllers, memory devices, etc. These devices are also sometimes referred to as "nodes" in some implementations. In some architectures, devices of a conventional classical communication network communicate with one another through a server. Specifically, each of the devices configure to a port number, and output and/or receive information from a server that each of the devices are in communication with.

Communication between devices is frequently targeted by, and in some instances, intercepted and exploited by unauthorized devices. For example, cyber-attack devices and programs often attempt to gain unauthorized access to communications performed between devices by obtaining access to a port that the devices are actively using. One measure that can be implemented in an attempt to avoid this unauthorized access includes a moving target defensive strategy in which port numbers that are used for such communication are ongoingly changed. For example, the listening port of a server may be changed and/or the application programming interface (API) and/or calls used between a client and a server may be changed. However, this port change concept cannot be implemented in networks with public servers as every device has to know the new port number. Furthermore, this port change concept cannot be used for private communication groups because every device needs to be securely given the new port, which is a relatively complex and cumbersome process. Accordingly, there is a longstanding need for techniques that secure communication within communication networks.

SUMMARY

A computer-implemented method, according to one approach, includes receiving at least one set of qubits at a first client component. Transmission of the set of qubits is relatively highly secure because it can be relatively easily determined whether an unauthorized device has attempted to eavesdrop on the transmission upon receiving the set of qubits. The method further includes using the at least one set of qubits to index a configuration dictionary to determine a first configuration. The configuration dictionary defines a plurality of different configurations. Transmitting the set of qubits involves relatively far less processing resources being expended than otherwise sending configuration change instructions that detail all of the configuration parameters of a given configuration each time that a configuration change is to occur. Furthermore, transmitting the set of qubits ensures that configuration parameters of a next configuration are not intercepted, as qubits are characterized by superposition. Superposition means that a qubit exists in a superposition of all its possible quantum states. The method further includes causing the first client component to be configured according to the first configuration. Configuring the first client component according to the first configuration allows the first client component to thereafter communicate with other components, such as a server from which the set of qubits are received.

The first client component is a quantum device. The first client component being a quantum device ensures that the first client component is able to read a random number from each of the qubits. The random number may be used to index the configuration dictionary to determine a configuration to use.

The method further includes receiving, at the first client component, the configuration dictionary from a server, and storing the configuration dictionary. Storing the configuration ensures that the first client component can thereafter access and use the configuration dictionary for determining a configuration to use subsequent to receiving at least one qubit.

A computer program product, according to another approach, includes a computer readable storage medium having program instructions embodied therewith. The program instructions are readable and/or executable by a first client component to cause the first client component to perform the foregoing method.

A system, according to another approach, includes a processor, and logic integrated with the processor, executable by the processor, or integrated with and executable by the processor. The logic is configured to perform the foregoing method.

Other aspects and approaches of the present invention will become apparent from the following detailed description, which, when taken in conjunction with the drawings, illustrate by way of example the principles of the invention.

DETAILED DESCRIPTION

Figure 1:
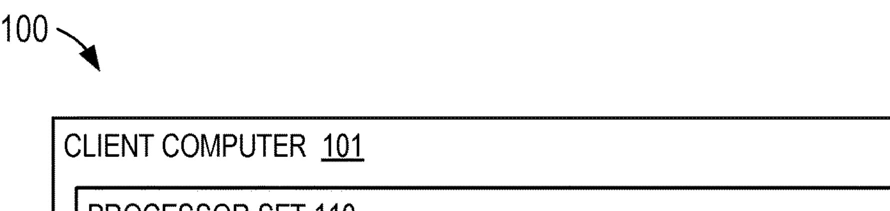
FIG. 1 is a diagram of a computing environment, in accordance with one approach of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for using a quantum network to distribute a communication network configuration in a distributed system.

In one general approach, a computer-implemented method includes receiving at least one set of qubits at a first client component, and using the at least one set of qubits to index a configuration dictionary to determine a first configuration. The configuration dictionary defines a plurality of different configurations. The method further includes causing the first client component to be configured according to the first configuration.

In another general approach, a computer program product includes a computer readable storage medium having program instructions embodied therewith. The program instructions are readable and/or executable by a first client component to cause the first client component to perform the foregoing method.

In another general approach, a system includes a processor, and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as configuration determination code of block 150 for using a quantum network to distribute a communication network configuration in a distributed system. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

Classical communication networks typically include a plurality of devices, e.g., computers, cellular phones, processors, controllers, memory devices, etc. These devices are also sometimes referred to as "nodes" in some implementations. In some architectures, devices of a conventional classical communication network communicate with one another through a server. Specifically, each of the devices configure to a port number, and output and/or receive information from a server that each of the devices are in communication with.

Communication between devices is frequently targeted by, and in some instances, intercepted and exploited by unauthorized devices. For example, cyber-attack devices and programs often attempt to gain unauthorized access to communications performed between devices by obtaining access to a port that the devices are actively using. One measure that can be implemented in an attempt to avoid this unauthorized access includes a moving target defensive strategy in which port numbers that are used for such communication are ongoingly changed. For example, the listening port of a server may be changed and/or the application programming interface (API) and/or calls used between a client and a server may be changed. However, this port change concept cannot be implemented in networks with public servers as every device has to know the new port number. Furthermore, this port change concept cannot be used relatively easily for private communication groups because every device needs to be securely given the new port, which is a relatively complex and cumbersome process. Accordingly, there is a longstanding need for techniques that secure communication within communication networks.

The port number used by devices for communication is just one component of a configuration that is needed for two devices to communicate. Other components of the configuration may include a network address of the machine, a set of conventions to be used when invoking application programming interfaces (API), the type of machine environment to be used on the device etc.

In sharp contrast to the deficiencies of the conventional approaches described above, the techniques of various approaches described herein enable secure communication within communication networks by using a configuration dictionary and qubits. These novel techniques use a quantum network to improve operational characteristics of conventional networks. The quantum network is a support network with the characteristic of generating a random number securely at two or more computers. This enables the weaknesses and issues with classical network infrastructure to be addressed and fixed. More specifically, at least some of these approaches include receiving at least one qubit at a client component, and using the at least one qubit to index a configuration dictionary to determine, from the configuration dictionary, a first configuration to be configured to. These techniques enable configuration protocol information to be securely sent, e.g., among quantum devices, throughout a communication network using mere qubits.

Figure 2:
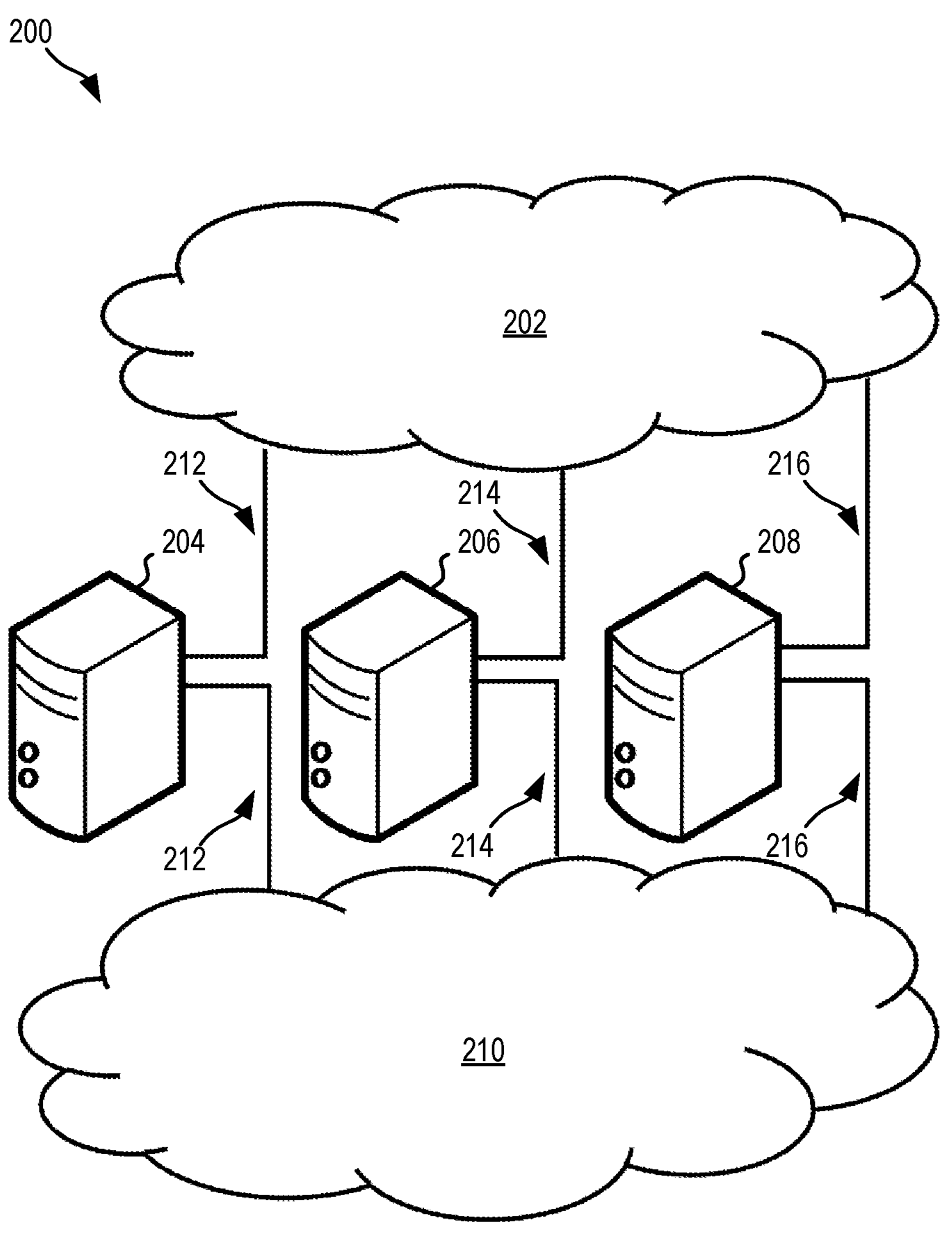
FIG. 2 is a representation of a quantum communications network, in accordance with one approach of the present invention.

FIG. 2 depicts a representation 200 of a quantum communications network, in accordance with one approach. As an option, the present representation 200 may be implemented in conjunction with features from any other approach listed herein, such as those described with reference to the other FIGS. Of course, however, such representation 200 and others presented herein may be used in various applications and/or in permutations which may or may not be specifically described in the illustrative approaches listed herein. Further, the representation 200 presented herein may be used in any desired environment.

The representation 200 illustrates a quantum communications network. The quantum communications network may, in some approaches, be a distributed system. For example, it may be noted that the quantum communications network of representation 200 includes a first computer device 204, a second computer device 206, and a third computer device 208, one or more of which may be client components described herein. These computer devices are each in communication, e.g., see logical connection paths 212, 214 and 216, with a WAN 202 and a quantum network 210. For context, these connections ensure that the computer devices are connected to both a WAN 202, which may be a classical network, as well as the quantum network 210.

Figure 3A:
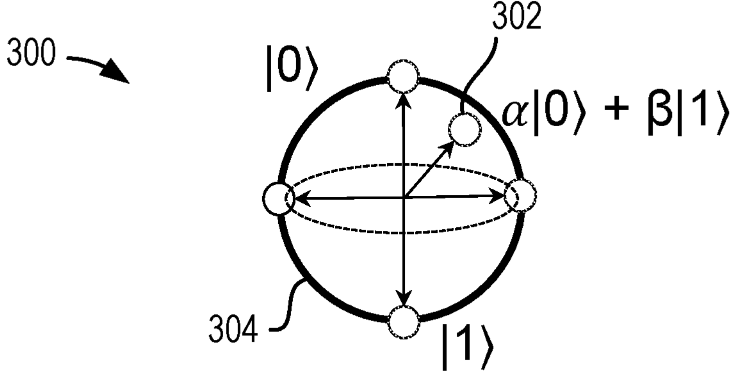
FIG. 3A is a representation of a qubit, in accordance with one approach of the present invention.
Figure 3B:
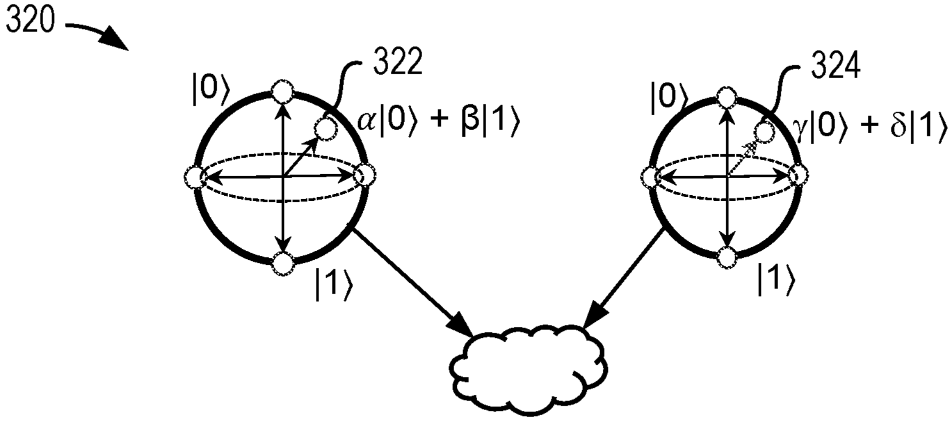
FIG. 3B is a representation of entangled qubits, in accordance with one approach of the present invention.

Quantum communication networks are a type of communication network that typically include a plurality of quantum devices, e.g., quantum computers, a quantum adapter, a quantum network controller, a quantum repeater, etc., in communication with one another. Reference may now be made to FIGS. 3A-3B in order to provide contextual descriptions of quantum communication networks that techniques described herein may be implemented in. Quantum communications networks communicate with each other by exchanging qubits, as opposed to sending traditional information bits. Quantum networks use uniquely quantum phenomena, like superposition, no-cloning, and entanglement that are not available to classical networks. Superposition means that a qubit exists in a superposition of all its possible quantum states. Measurement of a qubit selects one among these states. The qubit's quantum state cannot be measured without causing a disturbance that betrays the attempt. Nor can an arbitrary, unknown quantum state be copied, e.g., no cloning allowed. Entanglement creates two qubits whose states are linked with each other, measuring one qubit causes the state of the other qubit to collapse as well regardless of the distance between them. This allows the transfer of quantum state across a wide area using an entangled pair of qubits. A properly designed and operated quantum network derives inherent security from the properties of no-cloning. Qubits used for quantum communications can be generated by various means, including a system of beam-splitters and photodetectors, ion-trap system, or nitrogen vacancy center within a diamond crystal. Quantum communications can happen over optical fibers or over free space.

Quantum networks may be used for unicast communications, which is communication between a pair of computers. They may also be used for multicast communications, which is communication among three or more computers. A multicast set of qubits is sent by a sender to multiple receivers. A unicast set of qubits is sent by a sender to one specific receiver.

FIGS. 3A-3B depict representations 300, 320 of qubits, in accordance with several approaches. As an option, the present representations 300, 320 may be implemented in conjunction with features from any other approach listed herein, such as those described with reference to the other FIGS. Of course, however, such representations 300, 320 and others presented herein may be used in various applications and/or in permutations which may or may not be specifically described in the illustrative approaches listed herein. Further, the representations 300, 320 presented herein may be used in any desired environment.

Referring first to FIG. 3A, representation 300 illustrates, in one approach, the property of superposition of qubits. In some approaches, the features of quantum states that can be transferred on a fiber by single photons, are that these photons can be in a superposition of states. In some approaches, this means that a single photon can be set in a particular polarization angle. For example, the photon 302 of the block sphere 304 is shown to exist in a superposition of two states of zero or one, which is represented by the poles of the block sphere, e.g., see zero pole "|0>" and one pole "|1>". In some approaches, the photon can be positioned with respect to phase, as well as at any position at some angle between the poles, which may be calculated by the following equation:

$$\alpha|0>+\beta|1> \quad \text{Equation (1)}$$

where the spin of an electron is measured as a vector of unit size, $<\alpha, \beta>$ is the qubit state, and $\alpha^2+\beta^2=1$.

The superposition of a qubit, in some respects, means that the qubit can be in two states at once, and it is only determined what state this is at the time of measurement. This measurement produces a stochastic result, e.g., measurements may produce either a zero or a one value in a very unpredictable (random) manner. For example, a measurement of the photon 302 may indicate that the photon is positioned 70% towards the zero pole and 30% towards the one pole. Accordingly, randomly, 70% of the time, the photon 302 measures the value of zero and 30% of the time the photon 302 measures the value of one.

Various techniques described herein utilize the factor of randomness described above to transmit information securely between different quantum devices. "No-cloning" is another property of qubits, which refers to the fact that qubits cannot be duplicated. For example, when a qubit is read, the state of the qubit collapses to either a zero or a one value. Furthermore, in the event that a qubit is tampered with, the state of the qubit changes, thereby ensuring that an arbitrary state of the qubit cannot be copied, which provides a level of security in quantum transmissions. Because of this, an unauthorized user cannot eavesdrop on quantum transmissions over fiber and snapshot a copy of the transmissions without changing the state of the photons. This tampering is detectable by quantum devices upon receipt of the photon by exchanging some classical communication network information that reveals that the state of the photon output by a first of the quantum devices does not match the state of the photon thereafter received by a second of the quantum devices.

Referring now to FIG. 3B, entanglement is another property of qubits that is used in various approaches described herein. Entanglement refers to the property that two qubits can be entangled with each other, e.g., see first qubit 322 and second qubit 324, and share a state. For example, a state of these entangled qubits can be in the zero state and in the one state simultaneously. This causes a change in state of one of the qubits to change the state of the other entangled qubit. Using entanglement and superposition a random quantum state may be transmitted from one place to another. In some approaches, the photons may be calculated by the following equation:

$$\frac{1}{\sqrt{2}}(\alpha\delta \pm \beta\gamma),\ \frac{1}{\sqrt{2}}(\alpha\gamma \mp \beta\delta) \quad \text{Equation (2)}$$

As will be described elsewhere below, these types of quantum communications can be used and combined with classical communication networks to allow a sender and a receiver to have secure information transmitted across a quantum network, with the security measure that there has been no eavesdropping performed on the secure information therebetween.

Figure 4:
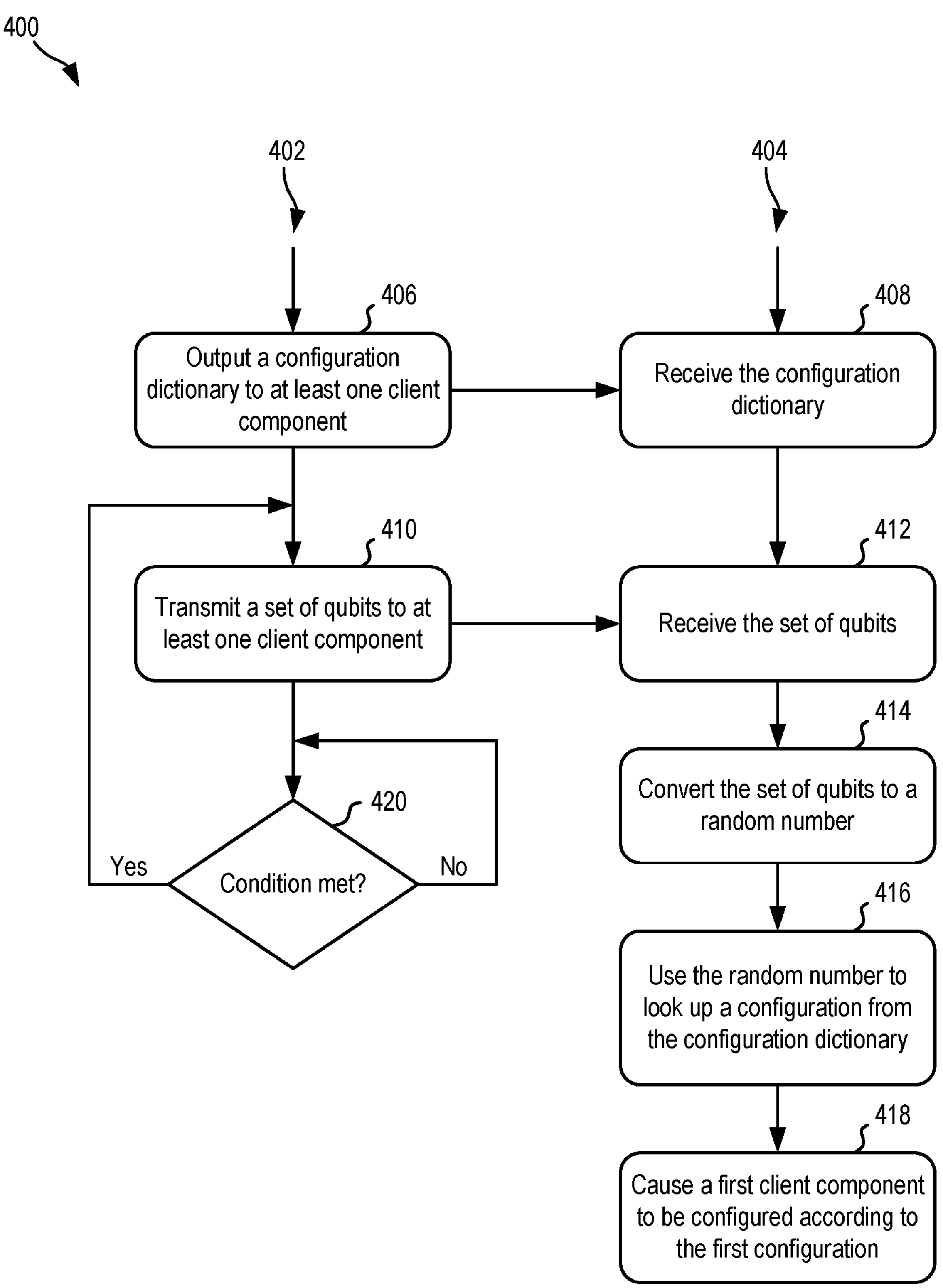
FIG. 4 is a flowchart of a method, in accordance with one approach of the present invention.

Now referring to FIG. 4, a flowchart of a method 400 is shown, according to one approach. The method 400 may be performed in accordance with the present invention in any of the environments depicted in FIGS. 1-5, among others, in various approaches. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various approaches, the method 400 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that, in some approaches, method 400 may be performed in communication networks that include at least some quantum devices, e.g., a quantum network. These quantum communication networks may, in some approaches, include private communication groups, e.g., virtual private network (VPN) established within enterprises, an extranet arrangement among organizations, IoT networks in various industries, integrated service router (ISR) networks in defense establishments, content delivery network (CDN) proxies for a web-service, etc. Furthermore, these quantum networks may, in some approaches, include a distributed system. For example, a quantum network may, in some approaches, include a plurality of distributed computer devices that are in communication, e.g., physical and/or wireless and/or indirect and/or direct, with a wide area network (WAN) and a quantum network.

It may also be prefaced that FIG. 4 includes operations that are performed from two different operational perspectives. For example, a first logical branch 402 of method 400 includes operations that may be performed by a server of a communication network that method 400 is performed in. In some approaches, the server is a quantum server that is configured to output qubits to one or more client components which may be quantum devices. In contrast, a second logical branch 404 of method 400 includes operations that may be performed by a client component of the communication network that method 400 is performed in. It should be noted that, although only one client component is represented in FIG. 4, in some approaches, the communication network may include a plurality of other client components that are configured and/or optionally caused to perform one of more operations similar to the operations performed by the client component associated with the second logical branch 404 of method 400. Accordingly, operations shown performed by the server to output information to the client component associated with the second logical branch 404 of method 400 may additionally and/or alternatively be performed by the server to output information to one or more other client components.

Method 400 may include generating a configuration dictionary. In some approaches, the configuration dictionary is generated by the server. In some other approaches, the configuration dictionary is generated by another device, e.g., a quantum device, a non-quantum device, etc., and provided to the server. For context, the configuration dictionary defines a plurality of different configurations. These configurations may detail at least some configuration parameters that client components may be configured to in order to communicate within the quantum communication network. For example, in one approach, a configuration parameter of at least some of the configurations of the configuration dictionary includes a network internet protocol (IP) address to use. In another approach, a configuration parameter of at least some of the configurations of the configuration dictionary includes a server port number. For example, the server port number may be a port of a server that a number of client components are to be configured to communicate with, e.g., be tuned to. In yet another approach, a configuration parameter of at least some of the configurations of the configuration dictionary includes a command to use, e.g., a name of a command to execute, a type of command to support, etc. Another configuration parameter of at least some of the configurations of the configuration dictionary includes an order to call arguments within a command. For example, during deployment of such a configuration, devices that are not configured to and/or do not call arguments in such an order would not be able to cause an API to be correctly displayed.

For context, in some preferred approaches, each of the configurations of the configuration dictionary are able to be defined by a predetermined value. For example, a value may be determined and used to index the configuration dictionary to determine one of the configurations that is associated with the predetermined value. Accordingly, each of the configurations of the configuration dictionary may be indexed according to a unique value during generation of the configuration dictionary. The configuration dictionary, in some approaches, details a plurality of configuration parameters, and therefore once output, the configuration dictionary significantly reduces the amount of information that is transmitted by the server in order to cause a configuration change to be performed. For example, rather than having to otherwise output instructions that detail a plurality of configuration parameters in order to cause a configuration change to be performed, the server only has to output the configuration a single time. Thereafter, details of a configuration change may be distributed throughout the communication network via the outputting of a single number associated with the specific configuration, e.g., the number may be used to index the configuration dictionary as will be described elsewhere herein. This reduces an amount of computer processing operations that are performed in order to maintain security of communication within communication networks.

Operation 406 includes outputting, from a server, a configuration dictionary to at least one client component. In some approaches, the configuration dictionary is output to a client component, e.g., a first client component, that is a quantum device, e.g., a quantum computer, a quantum controller, a quantum processor, etc. that is able to measure a value of qubits. The configuration dictionary may additionally and/or alternatively be output to a group of client components, e.g., a plurality of communication devices in a communication network. This preferably enables a common dictionary to be maintained on all client components, e.g., sites, to thereby enable configuration synchronization to be achieved among the components of the network. Note that depending on the approach, any one or more of such client components may be quantum devices. The configuration dictionary may, in some approaches, be output from the server in an encrypted state in order to ensure the security of the configuration dictionary. For example, encryption keys may, in some approaches, be distributed to client components before or after outputting of the encrypted configuration dictionary. Each of such keys may be configured to be used to decrypt the encrypted configuration dictionary and may be disposed of at any time and/or in response to receiving an instruction to do so.

Operation 408 includes receiving, at a first client component, the configuration dictionary from the server. The configuration dictionary preferably defines a plurality of different configurations. The first client component may store the configuration dictionary, e.g., in predetermined storage which may be volatile memory or non-volatile memory, in response to receiving the configuration dictionary. The predetermined storage may, in some approaches, be local storage on the first client component. In some other approaches, the first client component stores the configuration dictionary, and/or a directory thereof, on an off-site storage device, e.g., cloud storage. In yet some other approaches, the configuration dictionary is not actually received from the server, but instead a known type of authorization is received to at least temporarily access the configuration dictionary stored on another predetermined memory module. In yet some other approaches, the configuration dictionary is not actually received from the server, but may be a hyper-link to a remote web-service to retrieve the directory. For example, the hyper-link may be to a remote web-service that is configured to retrieve a configuration dictionary from a predetermined server. In some approaches, in which the configuration dictionary is not received from the server, method 400 may include using the hyper-link to retrieve the configuration dictionary, and storing the configuration dictionary, e.g., in a predetermined storage module.

In some approaches, at least a portion of the configuration dictionary is received by the first client component directly from the server. In contrast, in some other approaches, at least a portion of the configuration dictionary may additionally and/or alternatively be received indirectly from the server. For example, in one or more of such approaches, the configuration dictionary may be output from the server to a second client component and thereafter received by the first client component from the second client component. Note that the second client component may or may not be a quantum device, depending on the approach.

In approaches in which the configuration dictionary is received in an encrypted form, the configuration dictionary may be decrypted, e.g., using a security key provided to the first client component, before being stored. In some other approaches, the configuration dictionary may be stored in the encrypted form, and thereafter, at least temporarily decrypted in order to read and use the contents of the configuration dictionary.

The server transmits a set of qubits, e.g., where the set of qubits includes at least one and potentially a plurality of qubits, to at least one of the client components, e.g., see operation 410. In some approaches, the server transmits a set of qubits over a multicast quantum network to a plurality of the client components in the communication network. In some other approaches, the server additionally and/or alternatively transmits the set of qubits via unicast. The qubit(s) may be transferred using one or more techniques. For example, in one approach, the qubit(s) are transferred using photon polarization. In another approach, the qubit(s) are transferred using phase encoding. In yet another approach, the qubit(s) are transferred using entanglement. Note that, in one or more of these techniques, the qubit(s) may be transferred over predetermined optical fibers or free space.

Operation 412 includes receiving the set of qubits at the first client component. As described elsewhere above, transmission of the set of qubits is relatively highly secure because it may be relatively easily determined whether an unauthorized device has attempted to eavesdrop on the transmission upon receiving the set of qubits. For example, such verification may be performed by confirming predetermined information between the sender and receiver over a classical network, e.g., using classical communication protocols.

Operation 414 includes converting the set of qubits into a random number. It should be noted that when qubits of the set of qubits are measured either at the sender or the receiver, e.g., using a quantum component that is configured to convert qubits to random numbers, the measuring process results in a random number. The approaches for transmitting qubits to result in a secure random number can be facilitated by using a predetermined quantum key distribution protocol. In some approaches, techniques for using a predetermined quantum key distribution protocol that would become apparent to one of ordinary skill in the art upon reading the descriptions herein may be used.

In some approaches, converting the set of qubits to a random number may include causing the first client component to read a random number from the set of qubits, and the random number may be used to index the configuration dictionary to look up a configuration from the configuration dictionary in operation 416. Techniques for reading a unique number from a qubit that would become apparent to one of ordinary skill in the art upon reading the descriptions herein may be used in some approaches.

Preparation for using the qubits, e.g., such as reading the unique number, and/or actual use of the qubits may, in some approaches, depend on the number of qubits that are received by the first client component. In some approaches, a plurality of qubits may be transmitted by the server and/or received by the first client component. For example, in response to receiving a plurality of qubits, in some approaches, method 400 includes identifying a subset of the received qubits based on a predetermined parameter. The subset of the received qubits may include a single qubit in some approaches. In some other approaches, the subset of the received qubits may include a plurality of qubits, e.g., two qubits, three qubits, ten qubits, etc. For context, in some approaches, the plurality of qubits are sent to mask the qubit that is intended to be used. This provides a security measure for complicating the process that an unauthorized device would have to perform in order to even attempt to intercept and use the qubit.

In some preferred approaches, at least one of the qubits that is sent from the server to at least the first client component is associated with one of the configurations of the configuration dictionary. This configuration of the configuration dictionary will thereafter be used by client component(s) and/or the server to communicate according to. For example, in some approaches, the server transmits a set of qubits over a multicast quantum network to a plurality of the client components in the communication network for causing the client components to switch from a first configuration (a current configuration) to a second configuration. In other words, in one or more of such approaches, the qubit that is sent from the server to at least the first client component specifies, e.g., based on an preestablished indexing, a configuration of the configuration dictionary that the first client component is to be configured to, e.g., a next configuration, a scheduled configuration, a configuration that the first client is to be set to in response to a predetermined trigger event occurring, a configuration that the first client is to be set to in response to a predetermined amount of time passing, etc. Accordingly, in some approaches in which a plurality of qubits are received, the identified subset of the received qubits may be used to index the configuration dictionary. Meanwhile, the received qubits that are determined to not be part of the subset of the received qubits are not used to index the configuration dictionary.

In some approaches, the plurality of qubits described above that are received by at least the first client component includes at least a first qubit and a second qubit. In at least some of such approaches, method 400 may optionally include reading a random number from each of the qubits, e.g., each qubit is read to determine a numerical bit value associated with the qubit. In some approaches, the first qubit may be identified, based on a predetermined parameter, to be a qubit of the subset of the received qubits, and the second qubit may be identified, based on the predetermined parameter, to not be one of the qubits of the subset of the received qubits. In some approaches, at least some of the qubits may be sequentially transmitted, and a predetermined number of the transmissions may be identified as including the subset of the received qubits. For example, in one approach, it may be assumed that the server and at least the first client component have agreed to use a third transmitted qubit as the predetermined parameter for identifying a configuration of the configuration dictionary to use, e.g., the "first configuration." Accordingly, in response to the server sequentially transmitting and/or the first client component receiving a plurality of qubits, the third received qubit may be determined, based on the predetermined parameter, to be the subset of the qubits and thereby the qubit for identifying the first configuration. In some other approaches, the predetermined parameter may include a predetermined hashing function that is used to define the subset of the received qubits from the received qubits. More specifically, in one or more of such approaches, the received qubits may together define a binary number that may be input into the predetermined hashing function as input, and an output of the predetermined hashing function may include a binary number that is defined by a subset of the bits which are determined by the hashing function. A configuration that is associated with, e.g., indexed according to, the binary number that is defined by a subset of the bits may then be identified and used. In yet some other approaches, a predetermined cryptographic hash may additionally and/or alternatively be used in accordance with the predetermined parameter. By transmitting a plurality of qubits that are not all used to identify the first configuration, a relatively small amount of processing resources is expended with the benefit of the qubit that will be used being securely masked in a plurality of other transmitted qubits. It should be noted that the transmission of a plurality of qubits consumes significantly less processing resources and is relatively more secure than otherwise transmitting a configuration of a configuration dictionary each time that a configuration change is to be performed.

In some approaches, in response to a determination that a received qubit has been attempted to be read by an unauthorized device, e.g., eavesdropping, the first client component may relay the determination to the server. Thereafter, qubits output by the server may be masked using one or more of the techniques described above. For example, in response to the determination that a received qubit has been attempted to be read by an unauthorized device, a number of qubits sent by the server may be increased, e.g., sending entangled qubits instead of a single qubit, exponentially increasing a number of qubits that are transmitted in response to each instance of determining that a received qubit has been attempted to be read by an unauthorized device, sequentially sending a plurality of qubits instead of just a single qubit, etc.

Operation 418 includes causing the first client component to be configured according to the first configuration. In some approaches, causing the first client component to be configured according to the first configuration includes instructing the first client component to be configured, e.g., adjust current configuration settings, according to the first configuration. In another approach, causing the first client component to be configured according to the first configuration may include the first client component reading the contents of the first configuration of the configuration dictionary. In another approach, causing the first client component to be configured according to the first configuration may include issuing an instruction to one or more other quantum client components to also be configured according to the first configuration, e.g., thereby establishing quantum network synchronization. In yet another approach, causing the first client component to be configured according to the first configuration may include pausing one or more active operations that are actively being performed according to configurations parameters of a current configuration that is being at least temporarily replaced by the first configuration. As a result of updating the configuration of the first client component, the first client component is able to continue communications with the server and/or other communication devices that also are authorized devices, e.g., know and/or are provided with the configuration dictionary.

It should be noted that, in some approaches, the configuration of the configuration dictionary that is to be deployed at any given time may change. This is useful for preventing an unauthorized user from eventually determining configuration protocols that are actively being used for communicating in a communication network, e.g., a moving target defense approach that limits the continuous duration of time that a given configuration is used, which in turn, relatively strengthens network security and communications performed therein. Accordingly, in some approaches, in response to a predetermined condition being met, e.g., see "Yes" logical path of decision 420 return to transmission operation 410, the server transmits at least one qubit that defines a different configuration of the configuration dictionary to use. In some approaches, the predetermined condition includes a predetermined threshold time passing since a last qubit was transmitted, e.g., ten seconds, five minutes, twenty-four hours, etc. In some approaches, the predetermined condition includes checking that a given amount of data was exchanged between the server and the first client computer. In some approaches, the predetermined condition may include checking if the load on the server has exceeded some threshold, and/or if the amount of suspicious traffic has increased significantly on the server.

It should be considered that, in some approaches, the first client component may fail to configure according to the first configuration until after the server initiates a change in the current configuration. For example, the at least one qubit may be used to index the configuration dictionary more than a predetermined threshold of time after the at least one qubit is received. This may, for example, occur in response to the first client component being offline for at least some of a duration that the first configuration is being used. In response to the at least one qubit being used to index the configuration dictionary more than the predetermined threshold of time after the at least one qubit is received, method 400 may include receiving a connection refusal error notification subsequent to the first client component being configured according to the first configuration. In other words, the first client component may be unaware that the first configuration is no longer being used and therefore configure according to the first configuration and attempt a connection request with the server. Thereafter the connection refusal error notification may be received by the first client component. In some approaches, the first client component may output a request, e.g., to the server, to transmit an updated qubit that may be used to determine a current configuration from the configuration dictionary. In response to receiving the updated qubit, the first qubit may be used to determine the current configuration from the configuration dictionary.

With continued reference to decision 420, in response to a determination that the predetermined condition has not been met, e.g., see "No" logical path of decision 420 return to decision 420 until a determination is made that the predetermined condition is met.

The techniques of some approaches herein use a quantum network to improve operational characteristics of a classical communication network infrastructure. More specifically, the quantum network serves as a support network, with the characteristic of generating a random number. This enables fixes to relative weaknesses and issues otherwise associated with classical network infrastructure. For example, port changing concepts cannot feasibly and securely be implemented in conventional networks with public servers as every device has to know the new port number. Furthermore, this port change concept cannot be used for conventional private communication groups because every device needs to be securely given the new port, which is a relatively complex and cumbersome process. This relatively complex and cumbersome process is also subject to being intercepted by an unauthorized device that can eavesdrop on port changing messages in conventional communication networks. Furthermore, the sender and receiver of such messages have no way of knowing or determining whether such an eavesdrop event occurred, and therefore, the port changing message being compromised is unknown until the unauthorized device has already gained access to communication sessions in the conventional communication network. Accordingly, conventional communication networks are relatively insecure. A relatively extensive amount of processing resources and financial costs are associated with recovery from such an unauthorized device gaining access to communication sessions in these conventional communication networks. In sharp contrast to these deficiencies, the techniques described herein use qubits in the process of causing configuration changes. Use of these qubits are relatively secure in that unauthorized devices are not feasibly capable of eavesdropping quantum transmissions and using the contents of the transmission to access network communication sessions thereafter. This is because the qubits exist in a superposition of more than one state, and eavesdropping attempts are detectable. Accordingly, the techniques described herein improve and secure the field of communication networks, and furthermore reduce an amount of processing resources and financial costs associated with managing a communication network, as unauthorized access events are avoided.

The techniques described herein, e.g., such as the techniques of method 400, also are beneficial in that quantum communication networks are able to be used in novel ways that expands the efficiency and secureness of communication networks, hosted services and VPN. This also provides value-adds for collaboration with physicists/organizations working on quantum communications based on programs, and furthermore, provides a new use-case for quantum communications beyond quantum key distribution (QKD). These techniques also accelerate a pace of when quantum communications network begin to deliver value.

Figure 5:
FIG. 5 is a representation of a plurality of configurations of a configuration dictionary, in accordance with one approach of the present invention.
Figure 5:
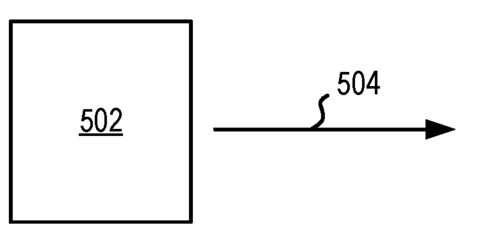

FIG. 5 depicts a representation 500 of a plurality of configurations of a configuration dictionary, in accordance with one approach. As an option, the present representation 500 may be implemented in conjunction with features from any other approach listed herein, such as those described with reference to the other FIGS. Of course, however, such representation 500 and others presented herein may be used in various applications and/or in permutations which may or may not be specifically described in the illustrative approaches listed herein. Further, the representation 500 presented herein may be used in any desired environment.

Representation 500 includes a plurality of configurations, e.g., see configuration 0, configuration 1, . . . , configuration $2^N$, that establish a configuration dictionary for enabling a concurrent change of configuration across all clients and a server of a communication network. In some approaches, a pre-configuration operation is performed in which the configuration dictionary is generated. Generating the configuration dictionary may include defining each of the configurations. Each of the configurations may include parameters. For example, the parameters of a configuration may specify a server port number, in one approach. In another approach, the parameters of a configuration may specify an order to call API arguments within a command, e.g., see API1, API2, API3, etc. In some approaches, the contents of the configuration dictionary are stored in a table and contains $2^N$ possible configurations.

The configuration dictionary is, in some approaches, distributed by the server to at least one client component. For example, an operation protocol of this distribution may include the server, a predetermined discretion of interval, broadcasting a set of qubits that results in a N-bit random number, and the server configuring, e.g., switching, to new configuration. Use of such qubits to define a configuration to use ensures a relatively secure target changing process as unauthorized devices are not able to determine a bit from the qubit as the qubit exists in a superposition of more than one state. Furthermore, any attempts made to perform such an eavesdrop are detectable by the intended recipient of the qubit.

The configuration dictionary is received by at least a first client component, which is preferably a classical device. A set of qubits is also transmitted by the server to, and received by, at least the first client component. It should be noted that the use of a set of qubits to cause a configuration change enables a preservation of processing resources. The set of qubits is read as a unique random number at all of the client components. The client components thereafter switch configurations using the random number 502 as an index to look up a new configuration, e.g., see operation 504. With the configuration identified, the client components connect to the server. However, in the event that the client component attempts to connect to the server with an outdated and previously used configuration, the client component receives a connection refused error asking the client component to change configuration.

It will be clear that the various features of the foregoing systems and/or methodologies may be combined in any way, creating a plurality of combinations from the descriptions presented above.

It will be further appreciated that approaches of the present invention may be provided in the form of a service deployed on behalf of a customer to offer service on demand.

The descriptions of the various approaches of the present invention have been presented for purposes of illustration, but are not intended to be exhaustive or limited to the approaches disclosed. Many modifications and variations will be apparent to those of ordinary skill in the art without departing from the scope and spirit of the described approaches. The terminology used herein was chosen to best explain the principles of the approaches, the practical application or technical improvement over technologies found in the marketplace, or to enable others of ordinary skill in the art to understand the approaches disclosed herein.

What is claimed is:

1. A computer-implemented method, comprising:

receiving at least one multicast set of qubits at a first quantum client component, wherein the at least one set of qubits is received at the first quantum client component from a server, wherein the at least one set of qubits are entangled by the server before being output via photon polarization to the first quantum client component, and are entangled when received by the first quantum client component;

using the at least one set of qubits to index a configuration dictionary to determine a first configuration, wherein the configuration dictionary defines a plurality of different configurations; and causing the first quantum client component to be configured according to the first configuration.

2. The computer-implemented method of claim 1, wherein the first quantum client component is a quantum computer.

3. The computer-implemented method of claim 1, further comprising: receiving, at the first quantum client component, the configuration dictionary from the server; and storing the configuration dictionary.

4. The computer-implemented method of claim 1, wherein configuration parameters of the different configurations are selected from the group consisting of: a network internet protocol (IP) address and a server port number.

5. The computer-implemented method of claim 1, wherein a plurality of qubits are received in the set of qubits, and further comprising: identifying a subset of the received qubits based on a predetermined parameter, wherein the identified subset of the received qubits are used to index the configuration dictionary.

6. The computer-implemented method of claim 5, wherein the plurality of qubits includes a first qubit and a second qubit, wherein the first qubit is identified, based on the predetermined parameter, to be a qubit of the subset of the received qubits, wherein the second qubit is identified, based on the predetermined parameter, to not be one of the qubits of the subset of the received qubits.

7. The computer-implemented method of claim 1, further comprising:

receiving, at the first quantum client component, a hyper-link to a remote web-service that is configured to retrieve a configuration dictionary from a server;

using the hyper-link to retrieve the configuration dictionary; and storing the configuration dictionary.

8. The computer-implemented method of claim 1, further comprising: converting the set of qubits to a random number, wherein the random number is used to index the configuration dictionary.

9. The computer-implemented method of claim 1, wherein the at least one set of qubits is used to index the configuration dictionary more than a predetermined threshold of time after the at least one set of qubits is received, and further comprising: receiving a connection error notification subsequent to the first quantum client component being configured according to the first configuration.

10. A computer program product, the computer program product comprising a computer readable storage medium having program instructions embodied therewith, the program instructions readable and/or executable by a first quantum client component to cause the first quantum client component to:

receive, by the first quantum client component, at least one multicast set of qubits, wherein the at least one set of qubits is received at the first quantum client component from a server, wherein the at least one set of qubits are entangled by the server before being output via photon polarization to the first quantum client component, and are entangled when received by the first quantum client component;

use, by the first quantum client component, the at least one set of qubits to index a configuration dictionary to determine a first configuration, wherein the configuration dictionary defines a plurality of different configurations; and configure, by the first quantum client component, the first quantum client component according to the first configuration.

11. The computer program product of claim 10, wherein the first quantum client component is a quantum computer.

12. The computer program product of claim 10, the program instructions readable and/or executable by the first quantum client component to cause the first quantum client component to: receive, by the first quantum client component, the configuration dictionary from the server; and store, by the first quantum client component, the configuration dictionary.

13. The computer program product of claim 10, wherein configuration parameters of the different configurations are selected from the group consisting of: a network internet protocol (IP) address and a server port number.

14. The computer program product of claim 10, wherein a plurality of qubits are received in the set of qubits, and the program instructions readable and/or executable by the first quantum client component to further cause the first quantum client component to: identify, by the first quantum client component, a subset of the received qubits based on a predetermined parameter, wherein the identified subset of the received qubits are used to index the configuration dictionary.

15. The computer program product of claim 14, wherein the plurality of qubits includes a first qubit and a second qubit, wherein the first qubit is identified, based on the predetermined parameter, to be a qubit of the subset of the received qubits, wherein the second qubit is identified, based on the predetermined parameter, to not be one of the qubits of the subset of the received qubits.

16. The computer program product of claim 10, the program instructions readable and/or executable by the first quantum client component to further cause the first quantum client component to:

receive, by the first quantum client component, a hyper-link to a remote web-service that is configured to retrieve a configuration dictionary from a server;

use, by the first quantum client component, the hyper-link to retrieve the configuration dictionary; and store, by the first quantum client component, the configuration dictionary.

17. The computer program product of claim 10, the program instructions readable and/or executable by the first quantum client component to further cause the first quantum client component to: convert, by the first quantum client component, the set of qubits to a random number, wherein the random number is used to index the configuration dictionary.

18. The computer program product of claim 10, wherein the at least one set of qubits is used to index the configuration dictionary more than a predetermined threshold of time after the at least one set of qubits is received, and the program instructions readable and/or executable by the first quantum client component to further cause the first quantum client component to: receive, by the first quantum client component, a connection error notification subsequent to the first quantum client component being configured according to the first configuration.

19. A system, comprising:

a processor; and logic integrated with the processor, executable by the processor, or integrated with and executable by the processor, the logic being configured to:

receive at least one multicast set of qubits at a first quantum client component, wherein the at least one set of qubits is received at the first quantum client component from a server, wherein the at least one set of qubits are entangled by the server before being output via photon polarization to the first quantum client component, and are entangled when received by the first quantum client component;

use the at least one set of qubits to index a configuration dictionary to determine a first configuration, wherein the configuration dictionary defines a plurality of different configurations; and cause the first quantum client component to be configured according to the first configuration.

20. The system of claim 19, wherein the first quantum client component is a quantum computer.

* * * * *